(12) United States Patent
Simula et al.

(10) Patent No.: US 8,511,760 B2
(45) Date of Patent: Aug. 20, 2013

(54) ROLLER BEARING TRACK BUSHING SYSTEM

(75) Inventors: Glen Raymond Simula, Hancock, MI (US); Craig Floyd Hughes, Hancock, MI (US)

(73) Assignee: GSE Technologies, LLC, Houghton, MI (US)

( * ) Notice: Subject to any disclaimer, the term of this patent is extended or adjusted under 35 U.S.C. 154(b) by 362 days.

(21) Appl. No.: 12/899,118

(22) Filed: Oct. 6, 2010

(65) Prior Publication Data

US 2012/0086265 A1    Apr. 12, 2012

(51) Int. Cl.
*B62D 55/12*    (2006.01)
(52) U.S. Cl.
USPC .............................. 305/198; 305/201; 305/104
(58) Field of Classification Search
USPC ................. 305/100–106, 121, 123, 164, 187, 305/191, 196, 198, 200–202
See application file for complete search history.

(56) References Cited

U.S. PATENT DOCUMENTS

| | | | | |
|---|---|---|---|---|
| 4,029,366 | A | * | 6/1977 | Baylor .......................... 305/104 |
| 4,568,090 | A | * | 2/1986 | Westemeier .................. 305/103 |
| 4,668,025 | A | | 5/1987 | MacDonald |
| 4,813,750 | A | | 3/1989 | Erlenmaier et al. |
| 5,069,510 | A | | 12/1991 | Cory |
| 5,853,233 | A | | 12/1998 | Turner |

* cited by examiner

*Primary Examiner* — Jason Bellinger
(74) *Attorney, Agent, or Firm* — Brooks Kushman P.C.

(57) ABSTRACT

A roller element bearing 40 track bushing system embodiment for track link assemblies 14 capable of being used on a vehicle 10 having an endless track 12. Each track link assembly 14 has a track shoe assembly 20 defining a front pin bore 22 and a rear pin bore 24. Each track link assembly 14 has a front pin 26 at least partially disposed within the front pin bore 22, and a rear pin 28 at least partially disposed within the rear pin bore 24. The embodiment discloses at least one roller element bearing 40 disposed within the front pin bore 22 around a portion of the front pin 26, at least one roller element bearing 40 disposed within the rear pin bore 22 around a portion of the rear pin 28. The roller element bearings 40 cooperate to prolong the useful life of the track link assembly 14.

20 Claims, 5 Drawing Sheets

ROLLER BEARING TRACK BUSHING SYSTEM

The invention was made in part with Government support. The Government may have certain rights to the invention.

TECHNICAL FIELD

The invention relates to track link assemblies on vehicles with endless tracks.

BACKGROUND

Vehicles with endless tracks are in contact with a larger surface area of the ground than a wheeled vehicle. The larger surface area results in a much lower force per unit area on the ground being traversed than a conventional wheeled vehicle of the same weight. This makes vehicles with endless tracks highly mobile and able to travel over most types of terrain. Vehicles with endless tracks have applications in military use, heavy commercial use, and others where the vehicle may travel over varying terrain.

The principal disadvantage is that a vehicle with an endless track is a more complex mechanism than a vehicle without an endless track. Each track link assembly must pivot relative to adjacent track link assemblies to accommodate changes in the ground surface and to follow a track progression around suspension components. The load of the vehicle, acceleration and deceleration of the vehicle, the wearing of the ground, the wearing of contacting components such as road wheels and a drive sprocket, as well as the relative pivoting of adjacent track link assemblies all cause degradation in the useful life of each track link assembly. Due to this degradation in useful life, track link assemblies must be maintained and replaced from time to time.

Degradation in useful life of a track link assembly can place limitations on a vehicle's long-range mobility. The higher need for maintenance lowers the vehicle's readiness and can come about at inopportune times, especially if the vehicle is being used in a war zone. Required replacement and maintenance of track link assemblies raise the costs of operating tracked vehicles and decreases the tracked vehicle's readiness.

Among the references considered before filing this application are: U.S. Pat. No. 5,853,233 to Turner, U.S. Pat. No. 5,069,510 to Cory, U.S. Pat. No. 4,813,750 to Erlenmaier et al., and U.S. Pat. No. 4,668,025 to Macdonald.

SUMMARY

One embodiment of the present invention is to provide a track link assembly that incorporates roller element bearings disposed between pins and track shoe assemblies. A track shoe assembly defines a front pin bore and a rear pin bore. A front pin is partially disposed within the front pin bore, and a rear pin is partially disposed within the rear pin bore. In this embodiment roller element bearings are disposed within the front pin bore around a portion of the front pin, and within the rear pin bore around a portion of the rear pin. The roller element bearings prolong the useful life of the track link assembly.

Another embodiment of the present invention is to provide a roller element bearing system for an endless track on a vehicle. Front and rear pin bores are defined by each track shoe assembly within the endless track. Pins are partially disposed within the front and rear pin bores. End connectors couple the rear pin of each leading track shoe assembly to the front pin of each following track shoe assembly and form an endless track. The endless track is used on a vehicle with at least one drive sprocket. The drive sprocket has teeth that engage the end connectors to drive the endless track and propel the vehicle. In this embodiment roller element bearings are disposed within the front and rear pin bores, and disposed around a portion of the front and rear pins, respectively. The roller element bearings maintain separation of the pins from the pin bore inner walls allowing the pins to rotate relative to the pin bore inner walls. As well, the roller elements within the roller element bearings rotate relative to the pin and the pin bore inner wall, reducing wear on the pin and the pin bore inner walls.

Yet another embodiment of the present invention is to provide a method for equipping an endless tracked vehicle with a roller element bearing system to prolong the useful life and readiness of the vehicle. In this embodiment the method provides track shoe assemblies with front and rear pin bores. The method also provides disposing front and rear pins within the front and rear pin bores. The method finally provides for locating front and rear roller element bearings within the front and rear pin bores to prolong the useful life of the endless track.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
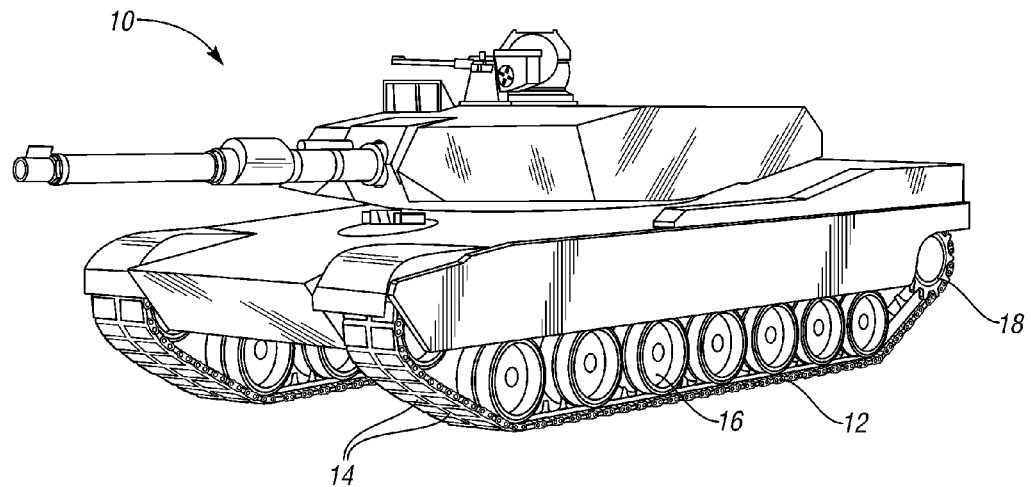
FIG. 1 is a perspective view of a vehicle with an endless track.

In regards to FIG. 1, an embodiment of a vehicle 10 is shown having an endless track 12 made up of a number of track link assemblies 14 joined to each other. In this embodiment the endless track 12 surrounds a number of road wheels 16 and a drive sprocket 18. A portion of the endless track 12 is disposed between the road wheels 16 and the ground such that the track link assemblies 14 between the road wheels 16 and the ground carry the load of the vehicle 10. As the drive sprocket 18 drives the endless track 12 a number of track link assemblies 14 are laid out on the ground under the road wheels 14 and then, since the track link assemblies 14 are joined to each other, are picked up off the ground and returned as they follow a track progression. During the track progression adjacent track link assemblies 14 pivot relative each other to allow for their return as well as to accommodate changes in the ground surface.

The load of the vehicle, the wearing of the ground, the wearing of contacting components such as road wheels 16 and drive sprockets 18, as well as the relative pivoting of adjacent track link assemblies 14 all cause degradation in the useful life of each track link assembly 14. Due to this degradation in useful life, track link assemblies 14 must be maintained and replaced from time to time. Replacement of track link assemblies 14 raises the maintenance costs of operating tracked vehicles and decreases the tracked vehicle's readiness. Other embodiments may have only a single road wheel 16 while being driven by a number of drive sprockets 18, or any combination thereof.

Figure 2:
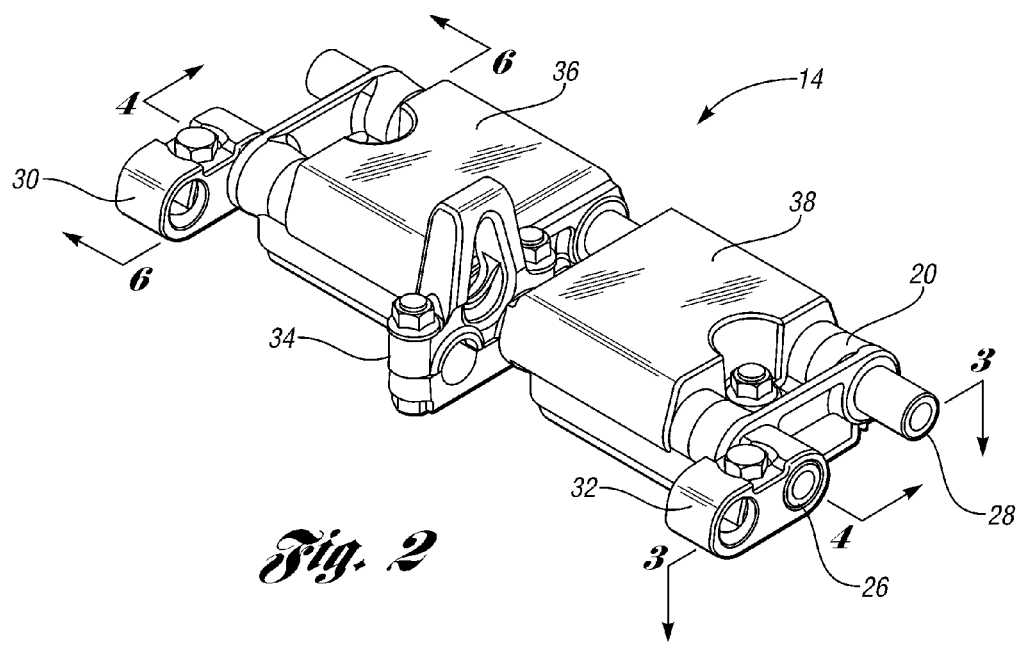
FIG. 2 is a perspective view of an embodiment of a track link assembly.

In regards to FIG. 2, an embodiment of a track link assembly 14 is shown with a track shoe assembly 20. The track shoe assembly 20 defines a front pin bore 22 and a rear pin bore 24 (shown in FIG. 3). A front pin 26 is partially disposed within the front pin bore 22 and a rear pin 28 is partially disposed within the rear pin bore 24. An inner end connector 30 and an outer end connector 32 are coupled around portions of the front pin 26 adjacent to respective edges of the track shoe assembly 20. The inner end connector 30 and the outer end connector 32 are coupleable to the rear pin of another track link assembly 14 to form an endless track 12 (shown in FIG. 1). A track guide 34 may be attached to a central portion of the track guide assembly 14 to aid in the guiding of the track progression around the road wheels 16 (shown in FIG. 1).

In the embodiment shown in FIG. 2, the track shoe assembly is shown as two components; an inner pad component 36 and an outer pad component 38. In other embodiments the track shoe assembly 20 is a single unitary piece. In yet additional embodiments, the track shoe assembly 20 is made up of more than two pad components that cooperate to form the front pin bore 26 and the rear pin bore 28. In these embodiments, at least one roller element bearing 40 (shown in FIG. 7) is disposed within the track shoe assembly 20 to prolong the useful life of the track link assembly 14.

Figure 3:
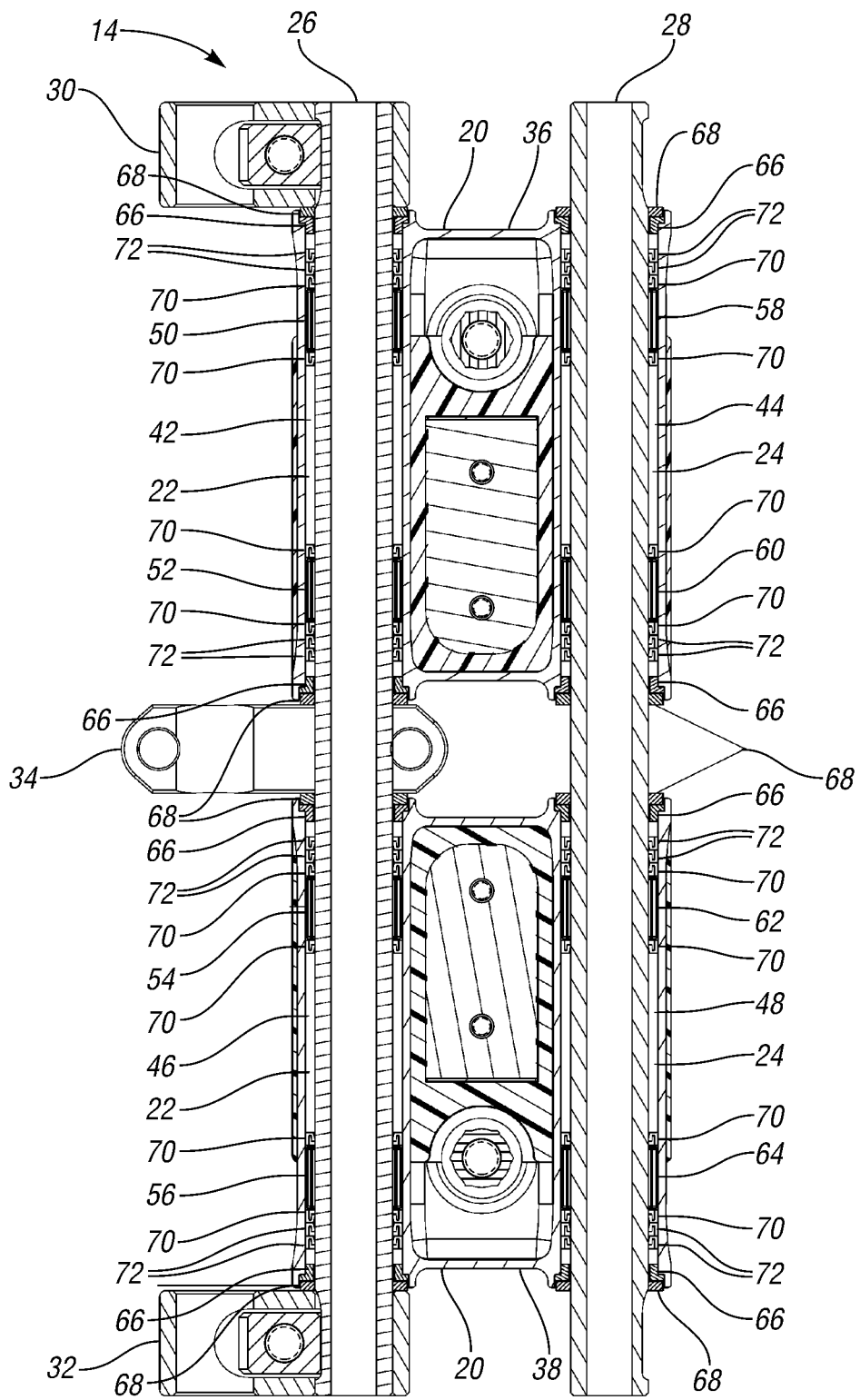
FIG. 3 is a cross-sectional view taken along the line 3-3 in FIG. 2.

In regards to FIG. 3, an embodiment is shown in which a track link assembly 14 has a track shoe assembly 20 made up of an inner pad component 36 and an outer pad component 38. The inner pad component 36 defines a front pin bore inner section 42 and a rear pin bore inner section 44. The outer pad component 38 defines a front pin bore outer section 46 and a rear pin bore outer section 48. In this embodiment, the front pin bore inner section 42 and the front pin bore outer section 46 cooperate to form a front pin bore 22. Similarly, the rear pin bore inner section 44 and the rear pin bore outer section 48 cooperate to form a rear pin bore 24. A front pin 26 is partially disposed within the front pin bore 22, and a rear pin 28 is partially disposed within the rear pin bore 24.

Figure 7:
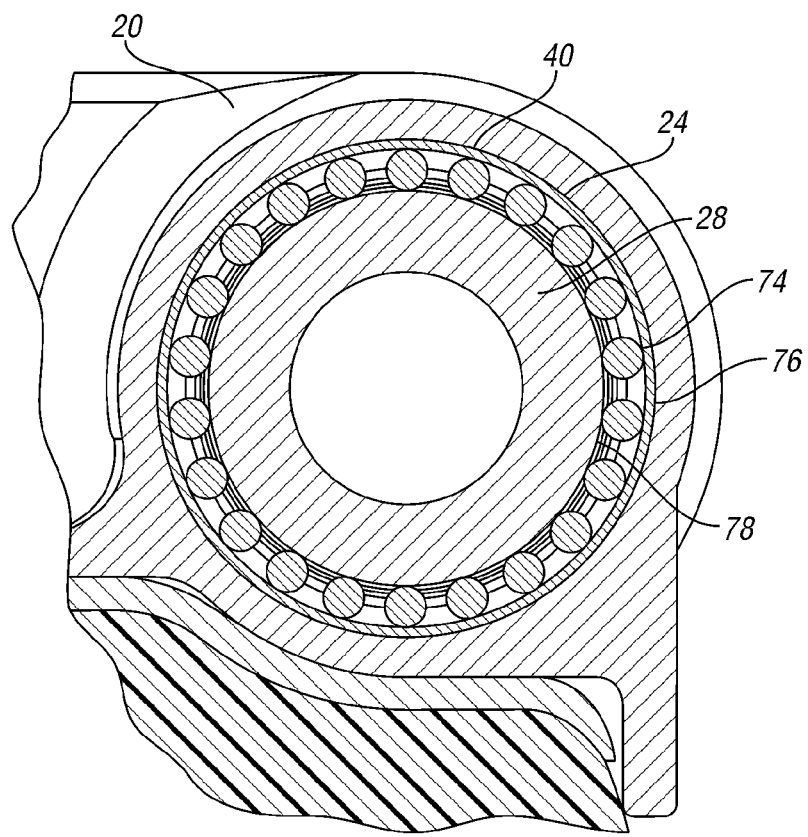
FIG. 7 is a magnified view of a portion of FIG. 6 within circle 7.

In the embodiment shown in FIG. 3, the track link assembly 14 has eight roller element bearings 40 (shown in FIG. 7). In this shown embodiment, the track link assembly 14 has a left inner front roller element bearing 50, a right inner front roller element bearing 52, a left outer front roller element bearing 54, and a right outer front roller element bearing 56, all disposed within portions of a front pin bore 22 and each around a portion of the front pin 26. Similarly, a left inner rear roller element bearing 58, a right inner rear roller element bearing 60, a left outer rear roller element bearing 62, and a right outer rear roller element bearing 64 are all disposed within portions of a rear pin bore 24 and each around a portion of a rear pin 28. The eight roller element bearings 40 in this embodiment cooperate to prolong the useful life of the track link assembly 14.

The number of roller element bearings 40 may vary in other embodiments. In an embodiment where track shoe assembly 20 comprises an inner pad component 36 and an outer pad component 38, there is at least one roller element bearing 40 disposed within a front pin bore inner section 42 and at least one roller element bearing 40 disposed within a rear pin bore inner section 44. As well, there is at least one roller element bearing 40 disposed within a front pin bore outer section 46, and at least one roller element bearing 40 disposed within a rear pin bore outer section 48. In an embodiment where the track shoe assembly 20 is a single component (not shown), there is at least one roller element bearing 40 disposed within the front pin bore 22 and at least one roller element bearing 40 disposed within the rear pin bore 24 in the track shoe assembly 14.

Figure 4:
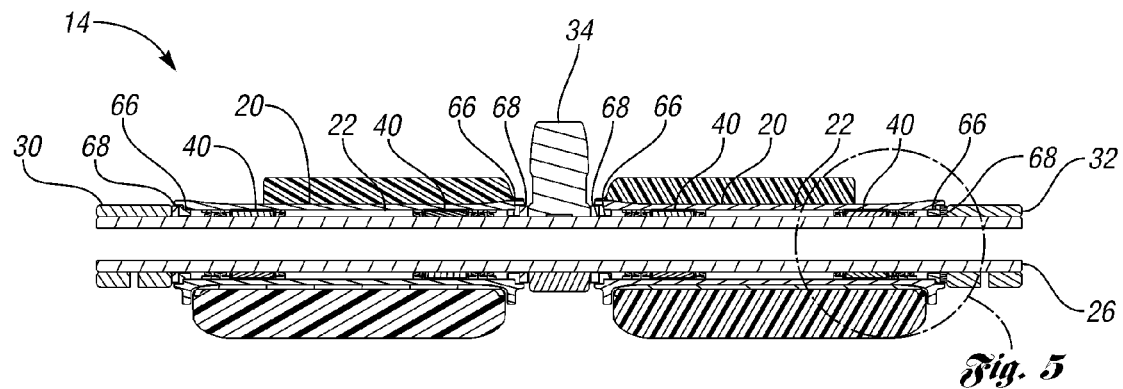
FIG. 4 is a cross-sectional view taken along the line 4-4 in FIG. 2.
Figure 5:
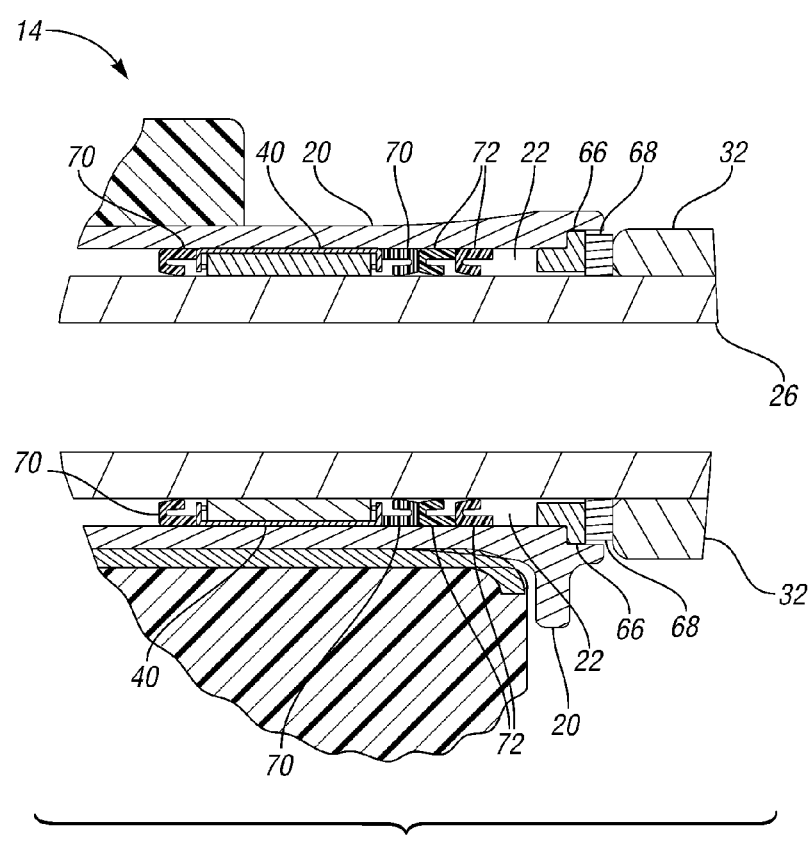
FIG. 5 is a magnified view of a portion of FIG. 4 within circle 5.

In regards to FIGS. 4 and 5, an embodiment of a track link assembly 14 is shown in which a track shoe assembly 20 defines a front pin bore 22. Partially disposed within the front pin bore 22 is a front pin 26. In the shown embodiment, thrust bearings 66 are disposed within the front pin bore 26 and around portions of the front pin 26 at the openings of the front pin bore 22. In further embodiments, thrust bearings 66 are disposed at openings of a rear pin bore 24 and around portions of a rear pin 28 (shown in FIG. 3). In some embodiments a thrust bearing washer 68 may be disposed around a portion of the front pin 26 adjacent each thrust bearing 68 on the side opposite of the track shoe assembly 20. The thrust bearing washer 68 may be located between the thrust bearing 66 and a connector, such as an inner end connector 30, an outer end connector 32, or a track guide 34 of the track link assembly 14 or an adjacent track link assembly 14. In this embodiment, the thrust bearings 66 cooperate with a number of roller element bearings 40 disposed within the front and rear pin bores 22, 24 to prolong the useful life of the track link assembly 14.

FIG. 5 shows an embodiment of a track link assembly 14 with a number of grease seals 70. The grease seals 70 are disposed within a front pin bore 22 and around a portion of a front pin 26, such that the grease seals 70 are located adjacent each side of each roller element bearing 40 disposed within the front pin bore 22. As well, grease seals 70 are disposed within a rear pin bore 24 around a portion of a rear pin 28, such that the grease seals are located adjacent each side of each roller element bearing 40 disposed in the rear pin bore 24 (shown in FIG. 3).

FIG. 5 also shows an embodiment of a track link assembly 14 having a number of dirt seals 72. The dirt seals are shown disposed within a front pin bore 22 and around portions of the front pin 26, located along the front pin bore 22 between a grease seal 70 and a thrust bearing 66. Dirt seals 72 further allow for prolonged exposure of the track link assembly 14 to harsh environments. The incorporation of dirt seals 72 into embodiments of the present invention prolong the useful life of the track link assembly 14.

Figure 6:
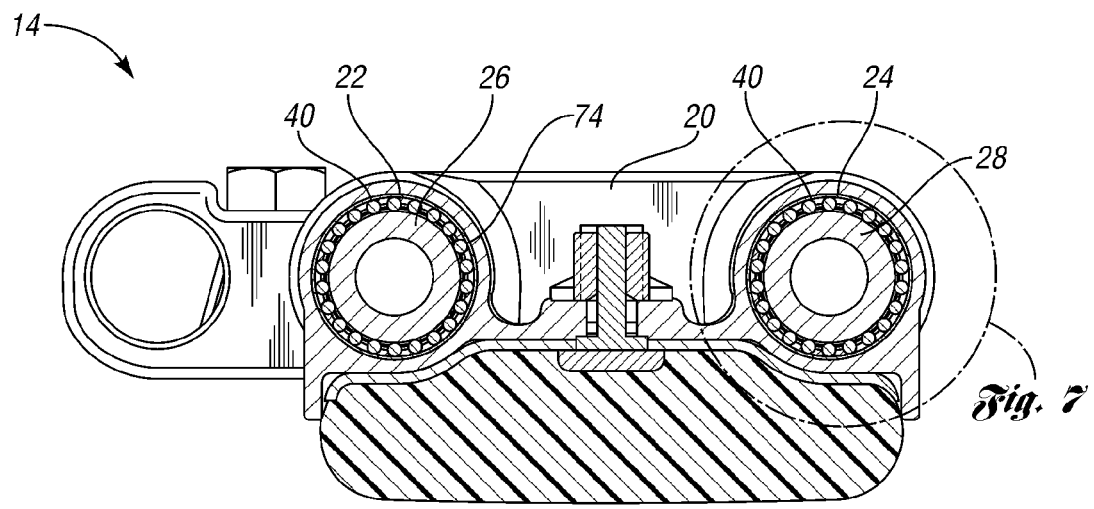
FIG. 6 is a cross-sectional view taken along the line 6-6 in FIG. 2.

In regards to FIGS. 6 and 7, an embodiment of a track link assembly 14 is shown with a track shoe assembly 20 defining a front pin bore 22 and a rear pin bore 24. In this embodiment, there is at least one roller element bearing 40 disposed within the front pin bore 22 around a front pin 26 and at least one roller element bearing 40 disposed within the rear pin bore 24 around a rear pin 28. Each roller element bearing 40 has a plurality of roller elements 74. In the shown embodiment, the roller elements 74 are needle bearing elements. Other rolling elements 74 may be used, such as, but not limited to balls and tapered rollers, and in any combination. Other rolling element bearing 40 designs may be used, such as, but not limited to, ball bearings, roller bearings, tapered roller bearings, and Spherical roller bearings. As well, cages (not shown) may be used to keep the rolling elements 74 separated.

FIG. 7 shows a roller element bearing 40 with an outer race 76 and an inner race 78. The roller elements 74 are disposed between the outer race 76 and the inner race 78 facilitating rotational movement of the races relative to each other. In this embodiment, a rear pin 28 has a sufficiently hardened surface to act as the inner race 78. This relative movement of the races allows for the front and rear pins 26, 28 to rotate within the track shoe assembly 20 and thus allows adjacent track link assemblies 14 to pivot relative to each other (shown in FIG. 1) prolonging the useful life of the track shoe assemblies 14.

Figure 8:
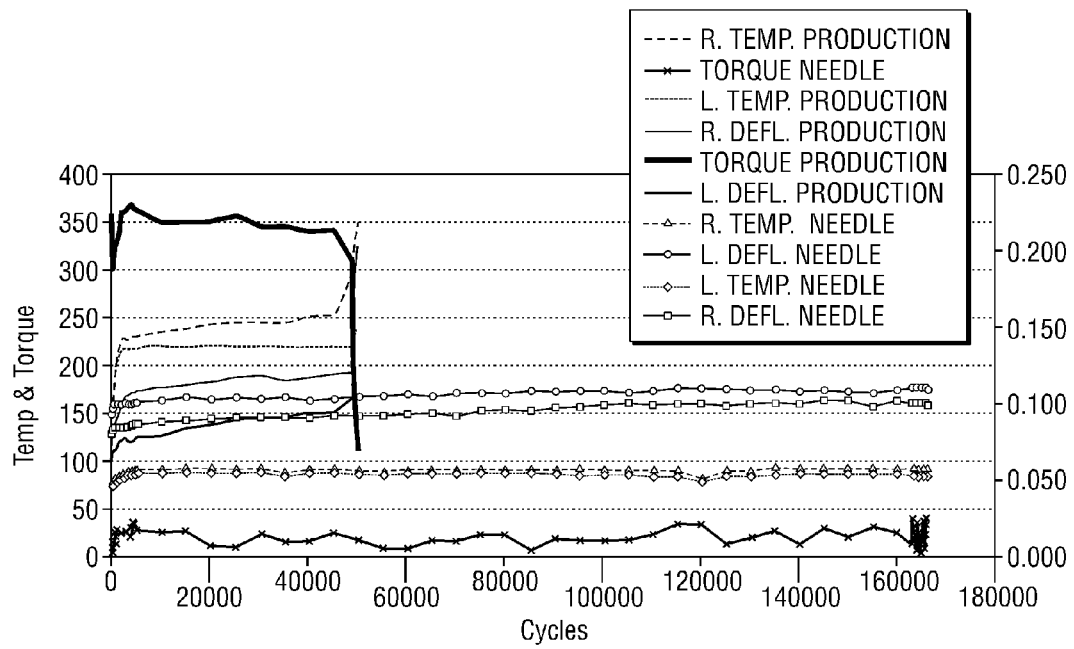
FIG. 8 is a graph of T158 test results of a track link assembly with production rubber bushings versus a track link assembly embodiment configured with needle bearings.

In regards to FIG. 8, test results are shown comparing a track link assembly 14 (shown in FIG. 1) with production rubber bushings, "production," versus a track link assembly 14 embodiment configured as shown in FIG. 3, "needle." The tests were run on a T158 laboratory bushings machine, which are used to perform all of the bushing qualification tests for T158 tracks in the United States. Standard conditions for T158 track testing were used; a radial load of 10 to 15 Kip cyclic at 0.835 Hertz, a rotation angle varying from positive 18 degrees to negative 8 degrees at 4.5 Hertz, and at ambient temperatures ranging from 70 degrees to 80 degrees Fahrenheit. Sensors were used to track temperatures, torque, and deflection. The track link assembly 14 configured with production rubber bushings failed at approximately 50,000 cycles. The track link assembly 14 as configured to the embodiment as shown in FIG. 3 prolonged the useful life of the track link assembly 14 past 60,000 cycles to 160,000 cycles when testing was suspended. The bearings 40 in the embodiment as tested maintained operating temperatures less than 200 degrees Fahrenheit. As well, the embodiment of FIG. 3, as tested, experienced considerably lower torques during the duration of the test.

Figure 9:
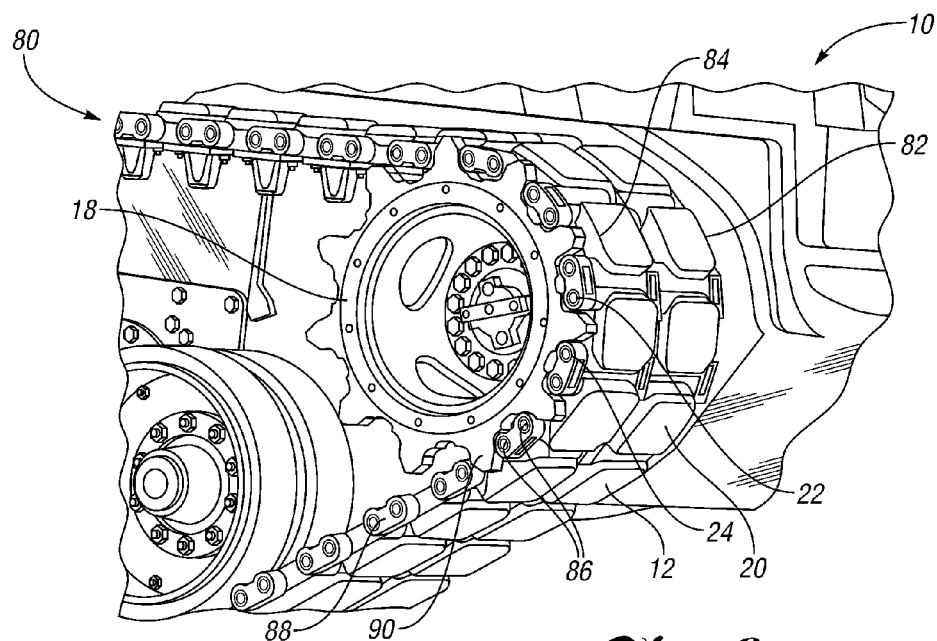
FIG. 9 is a perspective view of a vehicle with an endless track driven by sprocket teeth engaging end connectors of track link assemblies.

In regards to FIG. 9, a roller element bearing system 80 embodiment for a vehicle 10 with an endless track 12 is shown. In this embodiment, each track shoe assembly 20 defines a front pin bore 22, a rear pin bore 24, an inner edge 82 and an outer edge 84. In this embodiment, there are a number of pins 86 partially disposed within the front and rear pin bores 22, 24 that extend out past the inner and outer edges 82, 84. End connectors 88 are coupled around the ends of the pins 86 adjacent the inner and outer edges 82, 84 of the track shoe assemblies 20, such that an end connector 88 couples the rear pin 86 of each leading track shoe assembly 20 to the front pin 86 of each following track shoe assembly 20 thereby forming an endless track 12. A drive sprocket 18 with teeth 90 engage the end connectors 88 to drive the endless track 12. Roller element bearings 40 (shown in FIG. 7) are disposed within the front and rear pin bores 22, 24, and around portions of the pins 86 to maintain separation of the pins 86 from the pin bore 22, 24 inner walls allowing the pins 86 to rotate relative to the pin bore 22, 24 inner walls. This rotation allows adjacent track shoe assemblies 20 to pivot relative each other as the track shoe assemblies 20 follow a track progression around the drive sprocket 18 and other vehicle components and ground variations. The roller elements 74 (shown in FIG. 7) also rotate relative to the pin bore 22, 24 inner wall and the pin 86 reducing wear on the pin bore inner walls and the pins.

It may be desirable to avoid repeated replacement of track link assemblies 14 in most applications, especially in that of a war zone. Embodiments with roller element bearings 40 have been shown to maintain track pitch over time better than track link assemblies without roller element bearings. Roller element bearings 40 in embodiments disclosed have been shown to reduce sprocket wear and increase time between endless track 12 tensioning intervals. Embodiments with roller element bearings 40 have also shown to decrease fuel consumption when used on endless tracked vehicles 10. The roller element bearings 40 in this invention have also shown to reduce torsional stiffness and provide a substantially lighter un-sprung mass than track link assemblies without roller element bearings. In addition, roller element bearings 40, as shown by the embodiments disclosed, reduced rubber volume in track link assembles 14, thus providing for less costly recycling.

The above embodiments, in combination or in parts, provide a method for propelling a vehicle 10 having an endless track 12 comprising the steps of: (a) providing within the endless track 12 one or more track shoe assemblies 20, each track shoe assembly 20 defining front and rear pin bores 22, 24, (b) respectively disposing front and rear pins 26, 28 within the front and rear pin bores 22, 24, (c) locating at least one front and rear roller element bearings 40 respectively within the front and rear pin bores 22, 24 so that the at least one front and rear roller element bearings 40 cooperate to prolong the useful life of the endless track.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A track link assembly for a vehicle having an endless track, the assembly comprising:
    a track shoe assembly defining a front pin bore and a rear pin bore;
    a front pin at least partially disposed within the front pin bore;
    a rear pin at least partially disposed within the rear pin bore;
    at least one roller element bearing disposed within the front pin bore and around a portion of the front pin;
    at least one roller element bearing disposed within the rear pin bore and around a portion of the rear pin; and
    wherein the roller element bearings are disposed completely in their respective pin bores and spaced away from an opening of the pin bores such that the roller element bearings do not extend to or past the opening of their respective pin bores.

2. The track link assembly of claim 1, wherein the roller element bearings cooperate to provide a life of the track link assembly above 60,000 cycles on a T158 laboratory bushings machine under standard test conditions.

3. The track link assembly of claim 1, wherein the roller element bearings cooperate to provide a life of the track link assembly above 160,000 cycles on a T158 laboratory bushings machine under standard test conditions.

4. The track link assembly of claim 1, wherein the roller element bearings cooperate to provide a life by maintaining operating temperatures less than 200 degrees Fahrenheit during the duration of a T158 laboratory bushing machine test under standard test conditions.

5. The track link assembly of claim 1, wherein the roller element bearings comprise an outer race and a plurality of roller elements disposed between the outer race and its respective front or rear pin, wherein the front pin and the rear pin act as an inner race of the roller element bearings.

6. The track link assembly of claim 1, wherein the track shoe assembly defining the front pin bore and the rear pin bore has an inner pad component defining an inner section of the front pin bore and defining an inner section of the rear pin bore, and an outer pad component defining an outer section of the front pin bore and defining an outer section of the rear pin bore;
  at least one inner front roller element bearing disposed within a portion of the inner section of the front pin bore and around a portion of the front pin;
  at least one inner rear roller element bearing disposed within a portion of the inner section of the rear pin bore and around a portion of the rear pin;
  at least one outer front roller element bearing disposed within a portion of the outer section of the front pin bore and around a portion of the front pin; and
  at least one outer rear roller element bearing disposed within a portion of the outer section of the rear pin bore and around a portion of the rear pin.

7. The track link assembly of claim 6 further comprising:
  a left inner front roller element bearing disposed within a portion of the inner section of the front pin bore and around a portion of the front pin;
  a right inner front roller element bearing disposed within a portion of the inner section of the front pin bore and around a portion of the front pin, wherein the right inner front roller element bearing is to the right of the left inner front roller element bearing;
  a left outer front roller element bearing disposed within a portion of the outer section of the front pin bore and around a portion of the front pin;
  a right outer front roller element bearing disposed within a portion of the outer section of the front pin bore and around a portion of the front pin, wherein the right outer front roller element bearing is to the right of the left inner front roller element bearing;
  a left inner rear roller element bearing disposed within a portion of the inner section of the rear pin bore and around a portion of the rear pin;
  a right inner rear roller element bearing disposed within a portion of the inner section of the rear pin bore and around a portion of the rear pin, wherein the right inner rear roller element bearing is to the right of the left inner rear roller element bearing;
  a left outer rear roller element bearing disposed within a portion of the outer section of the rear pin bore and around a portion of the rear pin; and
  a right outer rear roller element bearing disposed within a portion of the outer section of the rear pin bore and around a portion of the rear pin, wherein the right outer rear roller element bearing is to the right of the left outer rear roller element bearing.

8. The track link assembly of claim 1, further comprising:
  a plurality of thrust bearings, wherein the track shoe assembly defines openings for the front pin bore and the rear pin bore and at least one of the plurality of thrust bearings is located at each pin bore opening disposed within a portion of the front pin bore and rear pin bore, and disposed around a portion of the front pin and rear pin, respectively.

9. The track link assembly of claim 1 further comprising:
  a plurality of grease seals, wherein at least one of the plurality of grease seals are disposed within a portion of the front pin bore and disposed around a portion of the front pin, such that at least one of the plurality of grease seals is adjacent to each side of the at least one roller element bearing, and at least some of the plurality of grease seals are disposed within a portion of the rear pin bore and disposed around a portion of the rear pin, such that at least one of the plurality of grease seals is adjacent to each side of the at least one roller element bearing.

10. The track link assembly of claim 1, further comprising:
  a plurality of dirt seals, disposed within a portion of the front pin bore and rear pin bore, and disposed around a portion of the front pin and rear pin, respectively.

11. The track link assembly of claim 1, further comprising:
  an inner end connector and an outer end connector, wherein the inner end connector is coupled around a portion of the front pin adjacent to an inner edge of the track shoe assembly, and the outer end connector is coupled around a portion of the front pin adjacent to an outer edge of the track shoe assembly, such that the end connectors are coupleable to the rear pin of another track link assembly.

12. The track link assembly of claim 1, further comprising:
  a track guide attached to a central portion of the track link assembly.

13. A roller element bearing system for an endless track on a vehicle comprising:
  a plurality of track shoe assemblies defining front and rear pin bores and inner and outer edges;
  a plurality of pins partially disposed within the front and rear pin bores, extending out past the inner and outer edges;
  a plurality of end connectors coupled around portions of the plurality of pins adjacent the inner and outer edges of the track shoe assemblies, such that an end connector couples the rear pin of each leading track shoe assembly to the front pin of each following track shoe assembly thereby forming an endless track;
  a drive sprocket with teeth, such that the teeth engage the plurality of end connectors to drive the endless track;
  a plurality of roller element bearings, where at least one of the plurality of roller element bearings are disposed within the front and rear pin bores between the inner and outer edges, and disposed around a portion of the front and rear pins, respectively; and
  whereby the plurality of roller element bearings maintain separation of the pins from the pin bore inner walls allowing the pins to rotate relative to the pin bore inner walls, as well as allowing the roller elements to rotate relative to the pin bore inner wall and the pin, respectively, reducing wear on the pin bore inner walls and the pins.

14. The roller element bearing system of claim 13, wherein the plurality of roller element bearings cooperate to provide a life of the endless track above 60,000 cycles as tested by a T158 laboratory bushings machine under standard test conditions.

15. The roller element bearing system of claim 13, wherein the plurality of roller element bearings cooperate to provide a life of the endless track above 160,000 cycles as tested by a T158 laboratory bushings machine under standard test conditions.

16. The roller element bearing system of claim 13, wherein the plurality of roller element bearings cooperate to provide a life by maintaining operating temperatures less than 200 degrees Fahrenheit during the duration of a T158 laboratory bushing machine the test under standard test conditions.

17. A method for propelling a vehicle having an endless track comprising the steps of:

(a) providing within the endless track one or more track shoe assemblies, each track shoe assembly defining front and rear pin bores;
(b) respectively disposing front and rear pins within the front and rear pin bores;
(c) disposing at least one front and one rear roller element bearings respectively within the front and rear pin bores between the track shoe assembly and the front and rear pins, so that the at least one front and one rear roller element bearings are disposed completely in their respective pin bores and spaced away from an opening of the pin bores such that the roller element bearings do not extend to or past the opening of their respective pin bores.

18. The track link assembly of claim 1 wherein the track shoe assembly defines openings for the front pin bore and the rear pin bore and the track link assembly further comprises a thrust bearing located at each pin bore opening disposed within and in contact with a portion of each pin bore and disposed around and in contact with each pin, two grease seals disposed within and in contact with a portion of each pin bore and disposed around and in contact with each pin, with one of the two grease seals disposed on each side of the at least one roller element bearing, and at least one dirt seal disposed within and in contact with a portion of each pin bore, disposed around and in contact with each pin, and disposed along the pin and pin bore between the thrust bearing and grease seal.

19. The roller element bearing system of claim 13 wherein there are at least two roller element bearings of the plurality of roller element bearings disposed within each of the front and rear pin bores, the two roller element bearings being spaced apart from the each other to provide a void between the respective pins and inner walls.

20. The method of claim 17 wherein the step of disposing at least one front and rear roller element bearings respectively within the front and rear pin bores, includes disposing at least two roller element bearings within each respective pin bore.

* * * * *